United States Patent [19]
Feder

[11] Patent Number: 5,957,524
[45] Date of Patent: Sep. 28, 1999

[54] AUTOMOBILE WINDOW INSERT UNIT

[76] Inventor: Gregg Feder, 27A Coleman St., West Haven, Conn. 06516

[21] Appl. No.: 08/821,563

[22] Filed: Mar. 21, 1997

[51] Int. Cl.⁶ .......................................................... B60J 1/20
[52] U.S. Cl. ............................................................. 296/152
[58] Field of Search ................................ 296/146.1, 147, 296/148, 152, 153, 154

[56] References Cited

U.S. PATENT DOCUMENTS 5,150,941  9/1992  Silzer et al. ......................... 296/153 X

*Primary Examiner*—Andrew C. Pike

*Attorney, Agent, or Firm*—David Fink

[57] ABSTRACT

An automobile window insert is used in conjunction with an automobile window frame that includes a slot and a bottom portion and has a moveable window within the window frame slot that can be moved downward into the window frame slot. The window insert has a mechanism that inhibits the insert from moving into the window frame slot beyond a predetermined depth and is shaped to be inserted into said window frame slot when the window is moved downward into the window frame slot so that the inhibiting mechanism rests on the bottom portion of the window frame. The window frame and the window insert in conjunction define an opening suitable for use by a driver to allow the driver to conveniently rest an arm or an elbow on the bottom portion of the window frame while seated in the automobile.

1 Claim, 1 Drawing Sheet

AUTOMOBILE WINDOW INSERT UNIT

FIELD OF THE INVENTION

The invention relates to an automobile window, and particularly to a removable automobile window insert unit which provides comfort to an automobile driver previously unachievable under a wide range of ambient atmospheric temperatures.

BACKGROUND OF THE INVENTION

A typical automobile includes windows on at least the sides adjacent to the seats for the driver and the passenger next to the driver. All of the prior art automobile windows operate to open or close though a mechanical arrangement which moves the window up or down into a slot defined in the respective car doors. Thus, a partially opened window is open at the top, not the bottom, of the window frame. The drive system for the automobile windows is either in the form of a crank hand operated, or an electrically driven system.

It is a common practice of drivers of automobiles to rest a left arm on the bottom ledge of the window frame while the window is fully opened. While there does not appear to be any scientific study of this phenomena, the inventor has not only observed this in numerous drivers operating vehicles, but the inventor himself prefers to drive with his left arm or elbow resting on the bottom ledge of the window frame. The inventor has made an informal evaluation of automobile drivers and found that a large number of people he interviewed also favored resting a left arm or elbow on the bottom of the window frame. The use of the window frame for this purpose requires the window to be lowered so that it is fully recessed in the door frame. Under such circumstances, the window is fully opened and this presents a problem for very cold days. The comfort of driving with one's arm or elbow resting on the window frame can chill the automobile greatly in very cold temperatures.

There appears to be no solution to this problem in the prior art and drivers who enjoy the comfort of using the window frame for resting an arm must suffer driving in a cold car during the winter, or surrender the comfortable driving position until warmer weather is present. In addition, during very hot days when the driver requires air conditioning, opening the window fully could heat the car and be disadvantageous.

The present invention overcomes the problem of the prior art and allows a driver to use the lower window frame while minimizing any discomfort due to cold temperatures.

SUMMARY OF THE INVENTION

The automobile window insert, according to one embodiment, allows a driver to use the lower portion of the automobile window frame while still maintaining most of the benefits of a closed window. The window insert is positioned into the window frame of an automobile. There is a mechanism such as a stop pin positioned in the insert that rests on the bottom portion of the window frame. When the window insert is fully inserted into the window an opening is defined and is suitable for use by a person to allow the person to conveniently rest an arm or an elbow on the bottom portion of the window frame.

DESCRIPTION OF THE PREFERRED EMBODIMENTS

Figure 1:
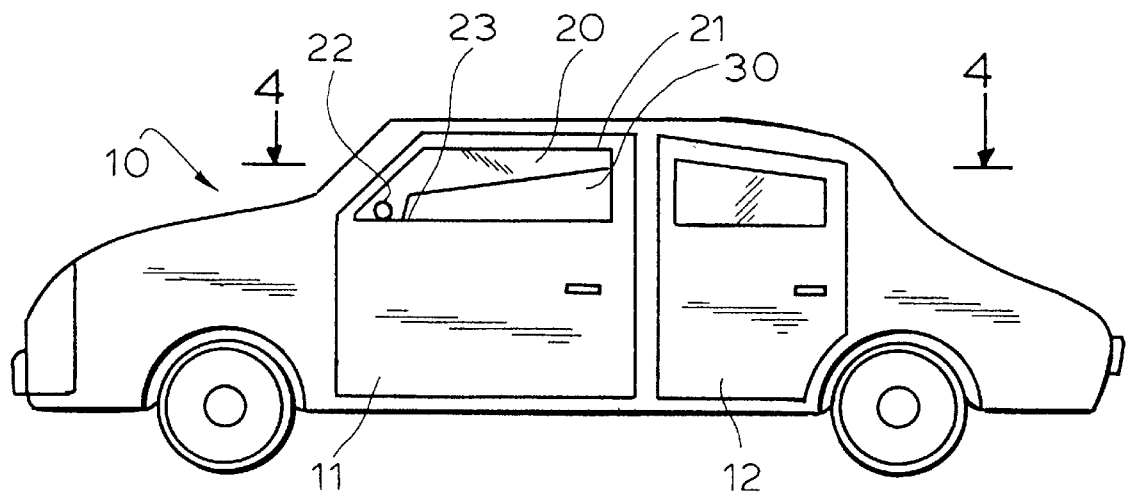
FIG. 1 is a sketch of a side elevational view of an automobile showing the invention positioned in a window frame.

FIG. 1 shows a side elevational view of a typical automobile 10 having two doors 11 and 12 on the side shown. The front door 11 is used in this country; however, the invention can also be used for a front door on the opposite side of the automobile 10. Automobile window insert 20 is positioned in window frame 21 of the door 11. The window frame 21 is a typical conventional design in which there is a slot defined around the window frame to hold the automobile window when the automobile window is fully closed. A stop means or stop pin 22 or the like is positioned in the insert 20 and rests on the bottom portion 23 of the window frame 21. The stop pin 22 can have a variety of forms and embodiments. The stop pin 22 can be a large pin 22a having a relatively large head 22b inserted into a hole (not shown) in the insert 20. In another embodiment, the stop pin 22 can be a plastic piece (not shown) bonded to the insert 20. This embodiment lends itself to being manufactured economically.

Figure 2:
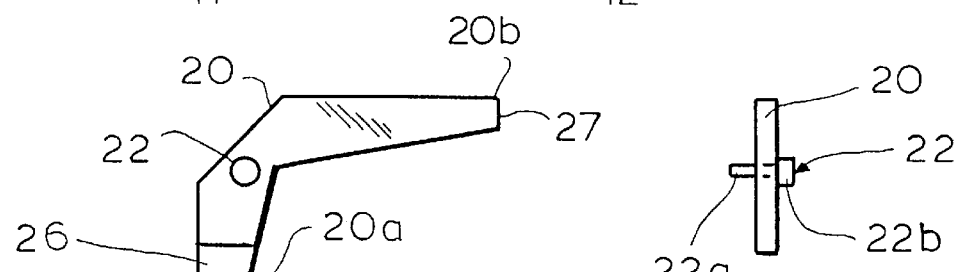
FIG. 2 is a front elevational view of the automobile window insert unit according to the invention.
Figure 3:
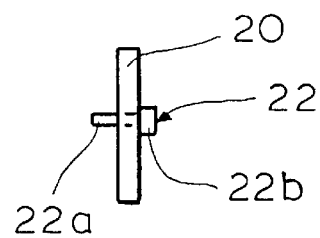
FIG. 3 is a side elevational view of the invention shown in FIG. 2.
Figure 4:
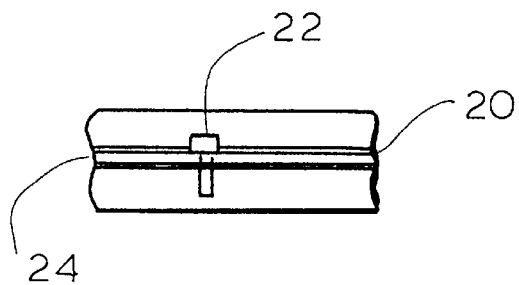
FIG. 4 is a fragmented view of the invention in its operating position in FIG. 1 along the line 4—4.

FIGS. 2 and 3 show the automobile window insert unit 20 in accordance with the invention. FIG. 4 shows how the insert unit 20 is positioned in slot 24 of the window frame 21. When the window insert unit 20 is inserted into the window frame 21, portion 26 is inserted into the slot 24 and portion 27 is inserted into a slot in the window frame 20 not shown, but well known to be present in conventional automobiles. In addition, the edge of the unit 20 shown in FIG. 2 from 20a to 20b engages the slot in the window frame 21 to inhibit the movement of the unit 20 during its use. The window insert 20 is preferably flexible to allow some bending to easily allow its positioning into the window frame 21. The engagement of the unit 20 into the window frame 21 has the portions 26 and 27 as well as the portion 20a to 20b working in cooperation of the stop pin 22 to maintain its position in the window frame 21. When the unit 20 is positioned as shown in FIG. 1, there is an opening 30 defined for the convenience of the driver. The insert 20 can be clear, or tinted, or a combination thereof.

Variations of the shape of the automobile window insert 20 can be made to suit the design of the automobile window frames of different automobile models, or to suit the particular preference of the driver and still be within the scope of the invention.

I wish it understood that I do not want to be limited to the exact details of the invention as shown and explained as other variations and modifications thereto will occur to people skilled in the art.

Having described the invention, what I claim as new and desire to be secured by letters patent is as follows:

I claim:

1. In an automobile having a window frame including a slot and a bottom portion and a moveable window within the window frame slot operable for being moved downward into the window frame slot, the improvement comprising: an automobile window insert having a stop means operable for inhibiting said insert from moving into said window frame slot beyond a predetermined depth and being shaped to be inserted into said window frame slot when the window is moved downward into the window frame slot so that said stop means rests on the bottom portion of said window frames; said window frame and said window insert defining an opening suitable for use by a person to allow the person to conveniently rest an arm or an elbow on the bottom portion of said window frame while seated in said automobile.

* * * * *